(12) United States Patent
Allington et al.

(10) Patent No.: US 7,285,300 B1
(45) Date of Patent: Oct. 23, 2007

(54) ROASTING SYSTEM

(75) Inventors: Roger A. Allington, Santa Rosa, CA (US); Philip A. Torbet, San Rafael, CA (US)

(73) Assignee: Group 32 Development & Engineering, Inc., Key Biscayne, FL (US)

( * ) Notice: Subject to any disclaimer, the term of this patent is extended or adjusted under 35 U.S.C. 154(b) by 0 days.

(21) Appl. No.: 09/187,472

(22) Filed: Nov. 6, 1998

Related U.S. Application Data

(60) Provisional application No. 60/065,083, filed on Nov. 11, 1997.

(51) Int. Cl.
*A23N 12/08* (2006.01)
(52) U.S. Cl. .................. 426/233; 426/629; 426/523; 426/524; 426/520; 426/466; 426/469
(58) Field of Classification Search .............. 426/231, 426/233, 629, 520, 523, 466–469, 524; 34/529
See application file for complete search history.

(56) References Cited

U.S. PATENT DOCUMENTS

| | | | | |
|---|---|---|---|---|
| 2,572,678 A | * | 10/1951 | Torres | 34/45 |
| 3,522,692 A | * | 8/1970 | Brookman et al. | 55/233 |
| 3,735,143 A | * | 5/1973 | Langford | 250/226 |
| 3,867,039 A | * | 2/1975 | Nelson | 356/178 |
| 4,110,485 A | * | 8/1978 | Grubbs et al. | 426/595 |
| 4,284,609 A | * | 8/1981 | de Vries | 423/242 |
| 4,350,442 A | * | 9/1982 | Arild et al. | 356/51 |
| 4,494,314 A | * | 1/1985 | Gell, Jr. | 34/10 |
| 4,707,138 A | * | 11/1987 | Coatney | 356/402 |
| 4,849,625 A | * | 7/1989 | Camerini Porzi | 250/226 |
| 4,860,461 A | * | 8/1989 | Tamaki et al. | 34/68 |
| 5,034,609 A | * | 7/1991 | Satake et al. | 250/339 |
| 5,062,066 A | * | 10/1991 | Scher et al. | 364/578 |
| 5,158,793 A | * | 10/1992 | Helbling | 426/231 |

(Continued)

FOREIGN PATENT DOCUMENTS

EP  40823 A  * 12/1981

(Continued)

*Primary Examiner*—Drew Becker
(74) *Attorney, Agent, or Firm*—Townsend and Townsend and Crew, LLP

(57) ABSTRACT

An apparatus and method of roasting foodstuff such as coffee beans employ a roasting chamber for roasting the beans. An air circulation system operatively coupled with the chamber flows heated air over the beans and thereby roasts the beans, and an air cleaning arrangement is operatively coupled with the air circulation system and located downstream of the chamber for removing substantially all particulates, smoke and volatiles entrained in the used air as it flows through the container and into the air cleaning arrangement to provide substantially pollutant-free used air. The circulation system uses atmospheric air and heats, cleans and cools it within as little as ¼ second. Sensors and a electronic controller are provided to monitor various parameters in the roasting apparatus and control the roasting characteristics. The darkness and/or color of the beans during roasting is monitored to ensure proper roasting. The roasting in roasting machines at a plurality of geographically separate locations is controlled by equipping each roasting machine with a computer with memory and providing a central control station for downloading control signals to the computer to control roasting.

30 Claims, 11 Drawing Sheets

U.S. PATENT DOCUMENTS

| | | | | |
|---|---|---|---|---|
| 5,385,083 | A * | 1/1995 | Toyokura | 99/355 |
| 5,690,018 | A * | 11/1997 | Hansen | 99/330 |
| 5,724,882 | A * | 3/1998 | Gallas et al. | 99/285 |
| 5,918,589 | A * | 7/1999 | Valle et al. | 126/193 |
| 5,958,494 | A * | 9/1999 | Tidland et al. | 426/466 |
| 6,106,877 | A * | 8/2000 | Allington et al. | 426/233 |
| 6,382,087 | B1 * | 5/2002 | Iiyama | 99/355 |
| 6,472,008 | B2 * | 10/2002 | Weng | 426/407 |
| 2003/0079612 | A1 * | 5/2003 | Con | 99/275 |

FOREIGN PATENT DOCUMENTS

| | | | |
|---|---|---|---|
| EP | 446794 A | * | 9/1991 |
| JP | 401098469 A | * | 4/1989 |
| JP | 02000189326 A | * | 7/2000 |
| WO | WO96/35335 | * | 11/1996 |
| WO | WO96/35335 A1 | * | 11/1996 |
| WO | WO9923888 A | * | 5/1999 |

* cited by examiner

ROASTING SYSTEM

RELATED APPLICATION

This is a continuation application of provisional patent application Ser. No. 60/065,083 filed Nov. 11, 1997, now abandoned.

BACKGROUND OF THE INVENTION

Roasting apparatus for roasting a variety of materials including fresh or green coffee beans is known. The taste and fragrance of coffee depend largely on how and the degree to which the coffee beans have been roasted and how quickly, following roasting, the beans are consumed by brewing coffee with them. It is desirable to produce roasted coffee beans that are consistent in taste and fragrance and in a manner that minimizes storage times to optimize the taste of fresh coffee.

Presently, to ensure proper roasting, an experienced roastmaster commonly roasts green coffee beans at a central location for distribution to multiple destinations for sale and consumption.

Since coffee beans are presently roasted at a central plant for sale at multiple retail locations, such as supermarkets, stores, and specialty shops, as well as coffee and espresso bars, the roasted beans must be stored and shipped before they reach the consumer. This is in and of itself time-consuming and costly. In addition, for cost and transportation reasons it is not feasible to effectively distribute coffee that is roasted on a given day for sale at the various retail establishments on the same day. Thus, coffee beans presently for sale at retail establishments are seldom fresh and, typically, they are several days to several weeks old before they reach the consumer. This compromises the quality, and especially the aroma, of the coffee and, additionally, increases its cost because of the need to make relatively many deliveries from the roasting plant to the retail locations. Attempts to retain the freshness of roasted coffee beans by, for example, placing them in vacuum bags following roasting do not in fact materially prolong the shelf life of the coffee beans or prevent a deterioration of their aroma if the roasted beans are stored for any length of time before they are consumed.

Present-day roasting techniques have additional problems. Since roasting takes place at relatively high temperatures, typically in the vicinity of about 500° F. (about 260° C.), large amounts of smoke and other byproducts are generated, such as white plume smoke, hydrocarbons, and volatile organic compounds ("VOCs") that pollute the atmosphere unless the exhaust gases are first cleaned. This requires an expensive and energy-consuming afterburner that is normally built into the exhaust gas stack for the roasting machine extending through the surrounding wall or ceiling so that the vented exhaust gases are reasonably clean and non-polluting.

The installation and maintenance of exhaust gas venting and scrubbing equipment is relatively expensive and requires modifications to the building. As a result, roasting coffee at individual retail locations has not previously been seriously considered. Instead, the equipment is installed in a few, relatively large roasting plants where the associated costs can be amortized over a relatively large volume of beans that is being roasted for distribution to and sale at many retail locations. Roasting coffee beans at individual retail locations is further unfeasible because of the need to have the roasting process supervised by an experienced roastmaster. The daily roasted coffee bean sales volume is typically too small to justify the high cost of a roastmaster.

As a result of all the foregoing, coffee is today roasted and distributed in practically the same manner as this was done for a very long time. However, the taste and aroma of coffee beans would be greatly improved if it were possible to roast the beans efficiently at the point of sale to the consumer, rather than at a remote, central plant, and the cost of coffee would be reduced if the need for a roasted coffee bean distribution system could be eliminated and coffee beans could be roasted without the supervision of an experienced roastmaster. The cost of coffee to the consumer could then be decreased and/or the profit margin for the coffee roaster and retailer could be increased.

The present invention, as further described below, achieves these goals while assuring a constant, uniform roasting of the beans, resulting in the desired constant and uniform aroma.

SUMMARY OF THE INVENTION

The roasting method and apparatus of the present invention is sufficiently inexpensive to build, install and operate so that it can be used at individual roasted coffee bean retail locations such as supermarkets, coffee shops, and the like. It cleans the hot air used for roasting and cools it to about room temperature so that the air can be discharged into interior locations, e.g. the interior of a store, without causing indoor pollution or undue heating. It requires no exhaust gas discharge to the outside of the building, it requires no afterburners to eliminate pollutants, and it roasts the coffee beans automatically without requiring the supervision of an experienced roastmaster.

A principal feature of the present invention therefore is that the roasting of beans, nuts and the like, and in particular of coffee beans, is automated and no longer relies on the subjective judgment of a roastmaster to determine how and when the beans have reached the desired aroma, flavor, and quality (hereinafter usually "aroma") and the roasting has to be terminated. This is achieved by continuously observing a measurable characteristic or parameter of the beans, preferably their darkness, and optionally their color, and terminating the roasting of the beans when the desired characteristic has been reached. In a presently preferred embodiment, the darkness of the beans is monitored with a reflectometer, or a spectrometer for measuring color, that views a flow or stream of coffee beans past a window that provides visual access to the interior of a roasting drum. A preferred embodiment employs a generally horizontally disposed, rotating roasting drum with interior vanes that extend radially from an outer periphery of the drum towards its center and over the axial length of the drum. The vanes are curved so that, as the drum rotates, each vane picks up beans when it passes the low point of the drum and carries a quantity of beans upwardly. Once the generally radially oriented sides of the vanes become downwardly inclined, the beans will roll off and drop back to the bottom of the drum, thereby generating intermittent streams of beans at the window that can be observed by the spectrometer.

The reflectometer directs laser light having a wavelength of between about 600-800 nm onto the beans. In one preferred embodiment of the invention the specific wavelength of the laser is 680 nm and in another embodiment it is 750 nm. The reflectometer analyzes the reflected laser light to monitor the change in the darkness of the beans in real time.

Applicants have determined that a reliable parameter for determining when a desired finish, i.e. the taste and aroma, of a given type of coffee beans has been reached is the darkness of the beans, coupled with the manner in which the finish is attained in terms of roasting time and other roasting parameters. Principal parameters that influence the finish of the beans are the roasting speed, or time over which the beans are roasted, as well as the prevailing pressure in the drum, which will vary in accordance with atmospheric pressure variations.

Before retail roasting takes place, the ideal or desired roasting profile for each type of bean is experimentally determined at a central control station by a roastmaster generally in the manner in which roastmasters currently determine a desired profile for a given bean. Upon reaching this point in the experimental roasting process, the monitored roasting parameter or parameters, for example the darkness or spectral characteristics of the beans, e.g. in terms of the wavelength, or a range of wavelengths, as well as roasting time, roasting drum temperature variations, and the effects, if any, of atmospheric pressure variations, are electronically recorded and stored for later use.

Applicants have further determined that the change in darkness of the beans during roasting plays a role in the finish of such beans when coffee is brewed from them. Contrary to past practice, when roasting was supervised by a roastmaster who subjectively determined when drum temperatures should be adjusted and roasting should be terminated, the present invention, relying on real time and objective monitoring of the roasting parameters, can adjust, again in real time, the roasting process to replicate the optimal roasting progression as previously determined by the roastmaster at each individual machine.

Thus, if the reflectometer of the roasting machine senses an accelerated or retarded darkening of the beans being roasted, adjustments to the roasting process, such as changing the hot roasting air temperature and/or flow rate, can be made in real time. This assures that the roasting process at each of the individual roasting machines precisely replicates the roasting process and profile that was previously performed by the roastmaster at the central control station during the sample roast, thus ensuring a constant and uniform bean finish. The established roasting parameters are recorded, stored and downloaded for subsequent use on the individual roasting machines. This represents a refinement, particularly advantageous for roasting coffee beans, that was not heretofore attainable because in the past the beans were roasted on the basis of the roastmaster's subjective observation and judgments concerning the progress of the roast without an objective monitoring and use of the parameters that determine the aroma of the roasted beans. Accordingly, the present invention assures a degree of consistent quality and aroma for roasted coffee beans that was heretofore simply unavailable.

A very important advantage of the present invention is that it permits one to replicate roasting results by using the darkness (or color) development time line for the beans being roasted to control the roasting drum temperature on a real-time basis throughout the roasting process to thereby precisely replicate the development and final taste and aroma profile of the beans. This is central to maintaining the consistency of the roasts and is not just a function of the final darkness (or color) of the beans. How that darkness is attained also determines the final profile of the roasted product, e.g. the roasted beans, because the same darkness (or color) can be attained over a wide range of roasting times, which in turn depends on other parameters such as, for example, the roasting temperature. The profile of the roasted beans will vary greatly based on how the ultimate color was attained. For example, if beans are roasted too fast to attain a given darkness, the outside will be darker than the inside and the desired expansion of the bean will not be achieved, which impacts the profile of the roasted beans. Thus, the key to consistency in the profile is to roast the beans in the same way, time after time. This is accomplished with the reflectometer (or spectrometer) and maintaining the preestablished darkness (or color) development time line and parameters. In the past this was impractical, if not impossible, because there was no real-time color monitoring of the beans being roasted inside the roasting drum.

The roasting of beans for consumption (e.g. retail sale in stores or the brewing of coffee in espresso shops and the like) is conducted on site; for example in a store or an espresso shop, with individual, self-contained coffee roasting machines constructed in accordance with the invention. Each such roasting machine is networked with a computer at the central control station that has the necessary processors and memory to record and store the roasting profiles/recipes and parameters needed for controlling and terminating the bean roasting.

The stored roasting parameters for each variety of beans to be shipped to the in-store machines are downloaded to the computer that forms part of the in-store roasting machine. Thereafter, the beans can be roasted with the in-store machine simply by activating it, and selecting the bean type and quantity and the desired darkness of roast. Drawing on the stored recipe for the desired roast, the machine assures that the desired progression of the roast, as primarily determined from the change in darkness of the beans in real time, is adhered to. The roasting process continues until the beans being roasted match the stored darkness for that type of beans and finish. When the desired color has been reached, the beans are removed from the roasting machine and cooled, e.g. on a cooling tray.

Typically, coffee retailers wish to have a variety of different beans, at times including different extents to which a given type of beans is roasted to provide flavor variations. For each bean type, the roasting parameters are established as is discussed above. In addition, if desired, different degrees of roasting for any one or all bean types can be established to provide a choice of finishes that is available for a given type of bean. All of the needed parameters are downloaded to each roasting machine, and the roasting parameters for the selected bean type are then used to control and terminate roasting when the selected finish for the chosen bean type has been reached.

The initially established roasting parameters can be downloaded as easily to one as to many, individual roasters. The automatic roasting method of the present invention is therefore ideally suited for use in a system that connects a central control station with multiple individual, geographically separate roasters. Since each roaster will use the same parameters (color development over time) for controlling and terminating the roast, the roasted coffee beans will have a consistently uniform finish regardless where they are roasted and even though they are roasted without the supervision of a roastmaster.

Thus, one aspect of the present invention is a method of roasting coffee beans by initially establishing the varying degree over time to which the beans must be roasted to attain a desired finish during a sample roast. A measurable first parameter, which is indicative that the beans have been sufficiently roasted to yield the desired finish, is generated and stored. When a batch of green coffee beans is to be roasted at one of the on-site roasting machines, the beans being roasted are monitored and a second parameter, which is compatible with the first parameter, is generated and compared with the first parameter. Upon detecting a match between the first and second parameters, which, for example, are signals indicative of the change in darkness of the sample roast (at the central control station) and the beans being roasted on-site, the roasting is discontinued. In addition, the progress of the roasting operation, and in particular the change in darkness or development of the beans during roasting, is monitored in real time and compared to the darkness change encountered during the sample roast. If, during a subsequent on-site production roast, the darkness (or color) development of the beans deviates from that recorded during the sample roast, other roasting parameters, such as the hot roasting air temperature and/or the roasting air flow rate, are adjusted until the change in darkness corresponds to that established by the sample roast. This assures that the coffee bean finish obtained during the sample roast and judged to be optimal for the bean is precisely replicated during each production roast on each of the individual roasting machines that form part of the overall system.

For roasting coffee and other nuts and beans in the manner described in the preceding paragraphs, the present invention provides self-contained roasting machines that can be installed, for example, inside a retail establishment without requiring a vent or exhaust to the exterior of the room. Generally speaking, such a roasting machine includes a container having a bean inlet and a bean outlet for holding beans to be roasted. An air circulation system is operatively coupled with the container for flowing heated intake air over the beans and thereby roasting the beans. The heated air exits the container as used exhaust air that includes smoke and other pollutants. An air cleaning arrangement is operatively coupled with the air circulation system and located downstream of the container for removing substantially all particulates, smoke, and volatiles entrained in the used air as it flows through the container to provide substantially pollutant-free used air. An air cooling arrangement is operatively coupled with the air circulation system downstream of the container for cooling the used air to about room temperature. A used air discharge is located downstream of the air cleaning and cooling arrangements for discharging at least a portion of the used air into an indoor environment substantially without adversely affecting the environment.

The intake air is preferably electrically heated to the desired roasting temperature to prevent the generation of relatively large volumes of combustion gases. The used air exiting the container is filtered to remove therefrom substantially all particulate matter of a size larger than about 1 micron, and before the used air is discharged into the surrounding store it is cooled to a temperature of no more than about 115° F. (about 46° C.) and preferably no more than about 100° F. (about 38° C.). When the filtered and cooled air is discharged, it will cause substantially no pollution and only negligible heating of air inside the store.

The global installation and operation of all individual roasting machines, and their interconnection and cooperation with the computer at the central roasting station, form another aspect of the invention, which, generally speaking, involves placing a roasting machine at each retail location or establishment and equipping each machine with a roasting drum or container for holding green coffee beans while they are being roasted, a hot air supply for heating the green beans to the roasting temperature, and an air removal system for directing used air away from the drum and cleaning it of substantially all debris, oil, smoke, and the like so that the used air can be discharged into the store atmosphere after it has passed the beans in the container without polluting it. During roasting, the beans in the drum are observed with a reflectometer or color analyzer and an output signal is generated therewith that reflects the observed darkness of the beans.

In a presently preferred embodiment, each roasting machine has an on-board computer to which the output signal is fed. At a central control station, the color and other parameters for each bean type that will yield the desired finish are determined, and corresponding control signals are generated, stored and downloaded to the computer of the individual, on-site roasting machines. During roasting at any given roasting machine, the stored control signals are compared with the output signal generated by the instrument. If the compared signals do not match at any time during the roasting period, heat and air flow are automatically adjusted to achieve matching signals. When the compared final darkness (or color) signals match, a command is generated and used for terminating the roasting of the beans in the container.

In an alternative embodiment, on-board computers on each of the on-site roasting machines can be eliminated. Instead, a mainframe computer is set up at the central control station and is coupled to the roasting machines for running them directly from the central control station. This can help to prevent possible roasting errors due to malfunctioning, individual on-board computers.

DETAILED DESCRIPTION OF THE INVENTION

The present invention is directed to the roasting of foodstuff and, in particular, to a coffee bean roasting method and apparatus having an internal air cleaning system that eliminates the need for exhausting roasting air to the exterior of buildings as well as for an afterburner to clean the roasting air before it is exhausted, that discharges clean air at or near room temperature that can be vented interiorly, and that assures consistent and uniform bean flavor, aroma and quality without the need for an attending roastmaster. As a result, roasting machines made in accordance with this invention can be placed inside stores and can be operated to provide daily roasted coffee beans that have consistent and uniform flavor. All this is achieved at a cost that is typically less than the cost of centrally roasting beans and distributing the roasted beans to retailers as is presently done. Although this application makes reference primarily to the roasting of coffee beans, the invention can be applied to roasting other foodstuffs such as other types of beans, seeds, nuts, kernels, and the like.

One aspect of the present invention is an automated method of roasting by computer monitoring and control without the need for subjective judgment. Applicants have determined that the darkness or color of roasted beans is a reliable indicator of the development of the beans during roasting and the finish of coffee when brewed with such beans. A reflectometer (or spectrometer) is used to monitor the change in darkness (or color) of the beans during roasting. When the beans have reached a predetermined darkness, the reflectometer sends a signal to the computer to terminate the roasting. To enhance the quality and consistency of the roasted beans, other parameters that affect the ultimate finish can and should also be monitored and input into the computer to control roasting. For instance, the roasting speed, or the time over which the beans are roasted, the color or darkness development during the prescribed roasting time, the prevailing pressure in the roasting chamber, the roasting temperature, and the like can be monitored and used to determine when roasting should cease and/or what roasting parameters, such as heat, air flow or pressure, need to be adjusted.

Figure 1:
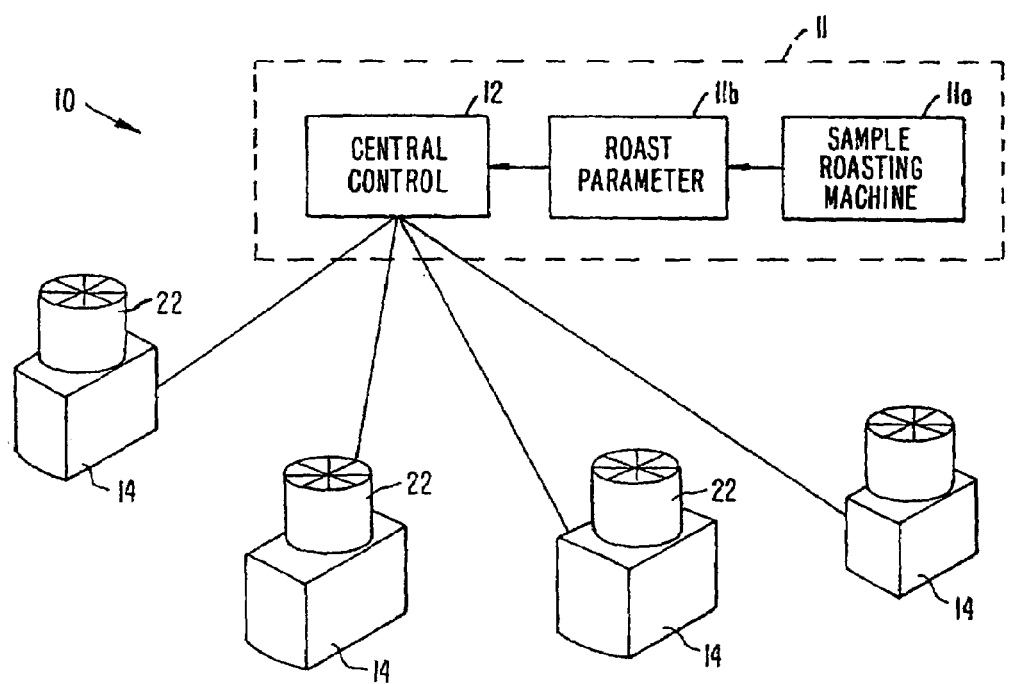
FIG. 1 is a perspective view schematically illustrating a centrally controlled roasting system made in accordance with the present invention.

FIG. 1 schematically illustrates a centrally controlled multi-station coffee roasting system 10 constructed and operated in accordance with the invention. It has a central control station 11 that includes a computer or master control server 12 and a plurality of, typically many, geographically dispersed individual roasting machines 14 networked with computer 12. Each of the individual roasting machines 14 includes an on-board computer with programmable logic controllers (PLCs) and/or a central processing unit (CPU) with on-board memory that is networked (telephonically or by wireless techniques) with the control server.

The control station includes a sample roasting machine 11a that is constructed substantially identical to the individual roasting machines 14 and with which a roastmaster performs sample roasts of different types of coffee beans to establish for each bean type one or more desired coffee roast profiles and finishes. Recordable parameters of relevant characteristics, primarily the darkness of the beans being sample-roasted and, secondarily, the roasting time, roasting pressure, roasting temperature, and the like, are monitored and recorded. When the roastmaster has attained a specific darkness that he or she wish to replicate with the roasting machines 14 installed at the retail establishments, the corresponding roasting parameters 11b are stored in the memory of master control server 12. The roastmaster will normally select a number of, say twelve, fifteen, or the like, different types of beans for which the needed roasting parameters are established and stored in the memory of the central processor. All parameters, or at least those for beans that are to be roasted on one or more of the individual roasting machines that form part of the system, are then downloaded to a memory that forms part of the computer contained in each of the individual roasting machines. The stored parameters are then available to control and terminate bean roasting on each individual machine, as is described in more detail below.

Alternatively, as already mentioned above, each individual roasting machine can be directly controlled with a mainframe computer at the central control station, thereby eliminating the need for on-board computers on the individual roasting machines.

In addition to controlling the roasting of the beans by the individual roasting machines, master control server 12 can advantageously be used to monitor and assist in the management of the individual machines. For example, the inventory of green beans at the individual machines may be monitored, and fresh beans can then be automatically reordered from a suitable supplier to assure that sufficient beans are always available when a low-inventory signal is received to assure an adequate bean supply at each individual machine. In addition, the machines, computers and the central computer can be used to monitor and record machine usage (for example on the basis of processed bean weight, roasting time, or the like) as well as for billing, establishing profiles of bean types and/or aroma selection systemwide and at each individual roasting machine, and the like.

Along the same lines, the machines' computers and the central control server can be used for diagnostic purposes, for example to determine malfunctions or needed adjustments and the like for each individual machine, by providing access to the various roasting process monitors and sensors that form part of the roasting machines.

A major advantage of the centralized system 10 is that consistent, uniform, high quality bean roasts are assured. Further, since each roasting machine is on-site and can be activated whenever needed, the retailer can limit each roast so that no more than one-day's requirements for the beans are roasted, thereby assuring freshness and the best possible product for the consumer.

Figure 2:
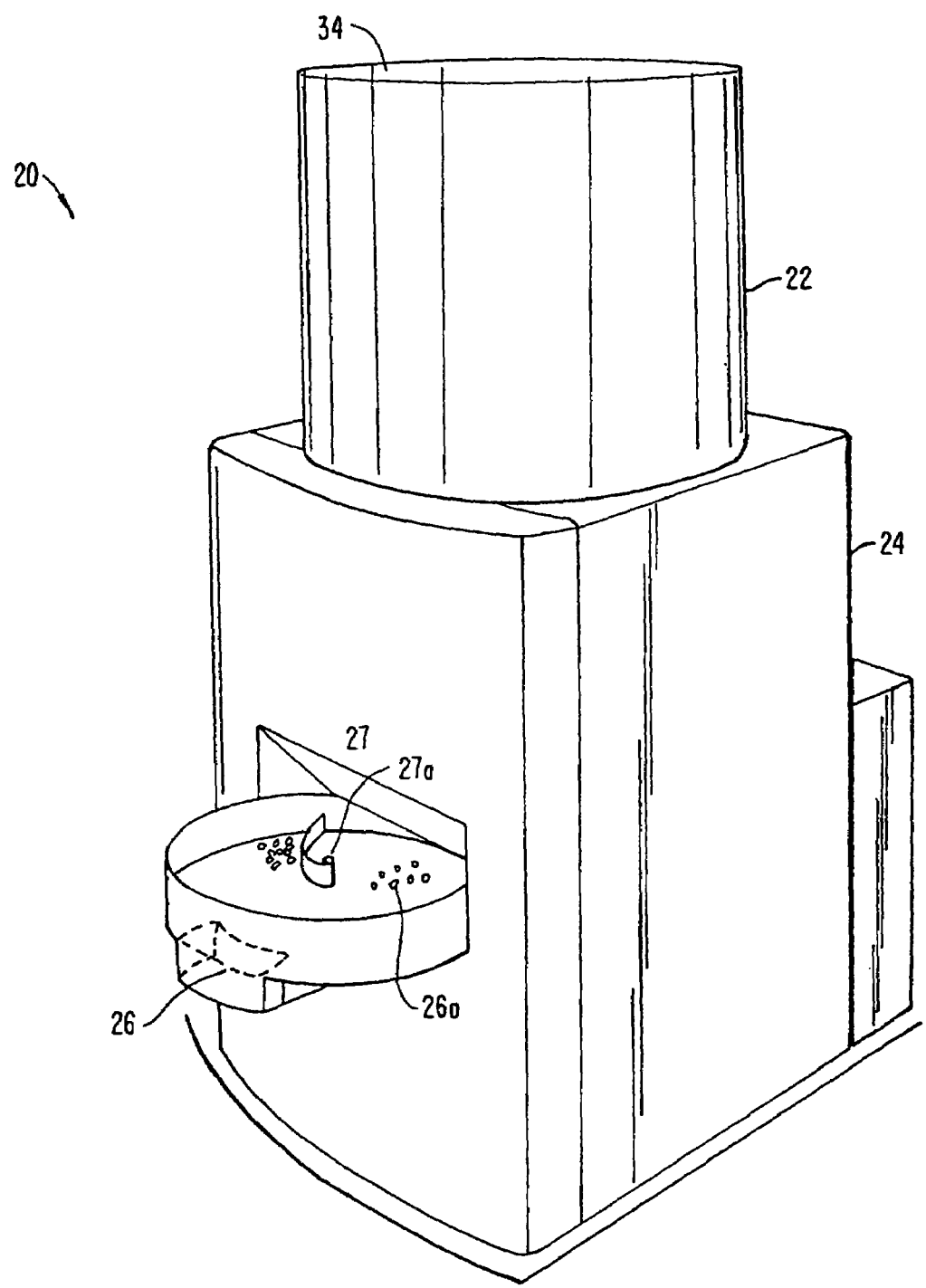
FIG. 2 is a perspective view illustrating the exterior of an individual roasting machine made in accordance with the present invention and forming part of the system shown in FIG. 1.
Figure 4:
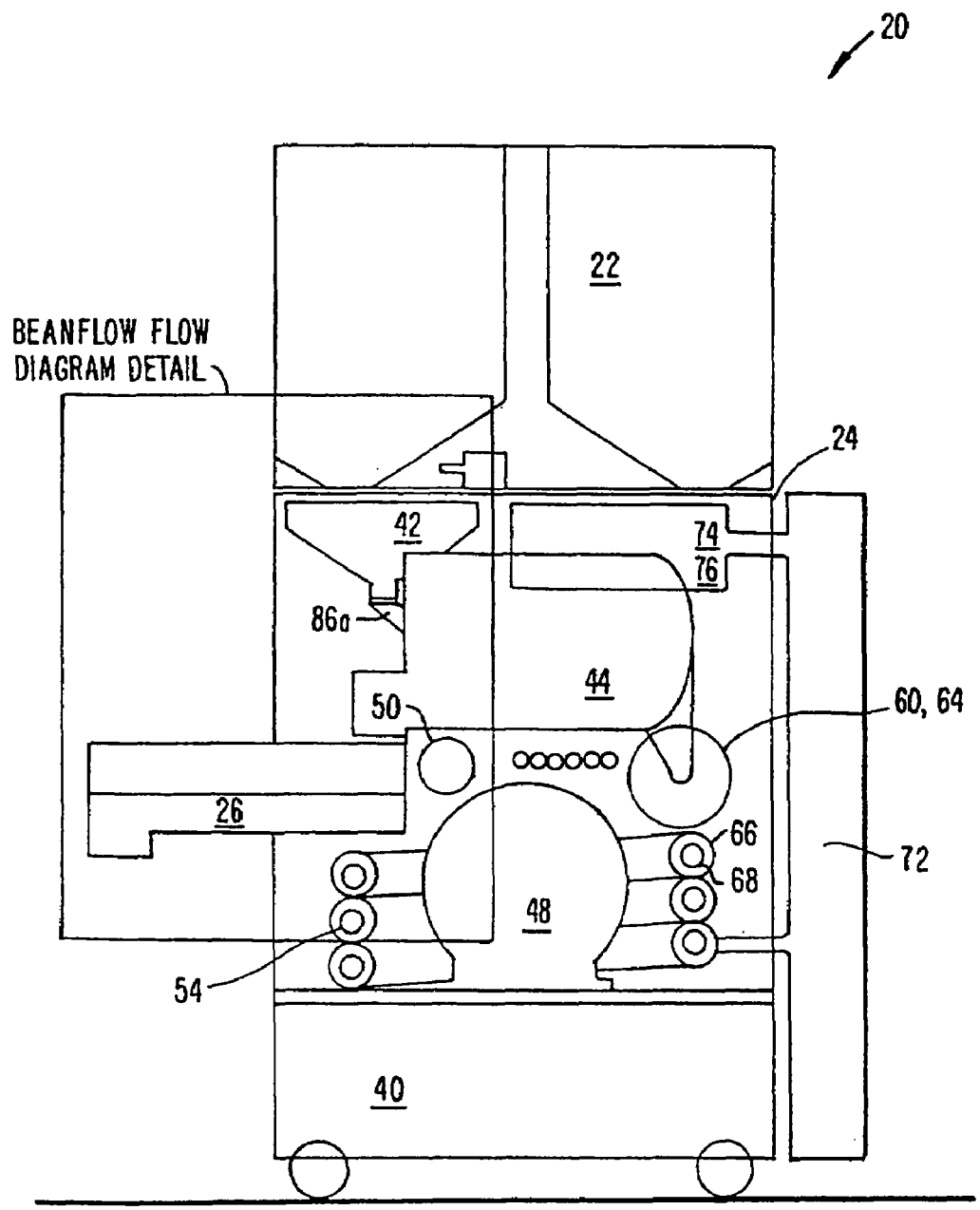
FIG. 4 is a side elevational view, partially in section, schematically illustrating the interior of the roasting machine of FIG. 2.
Figure 6:
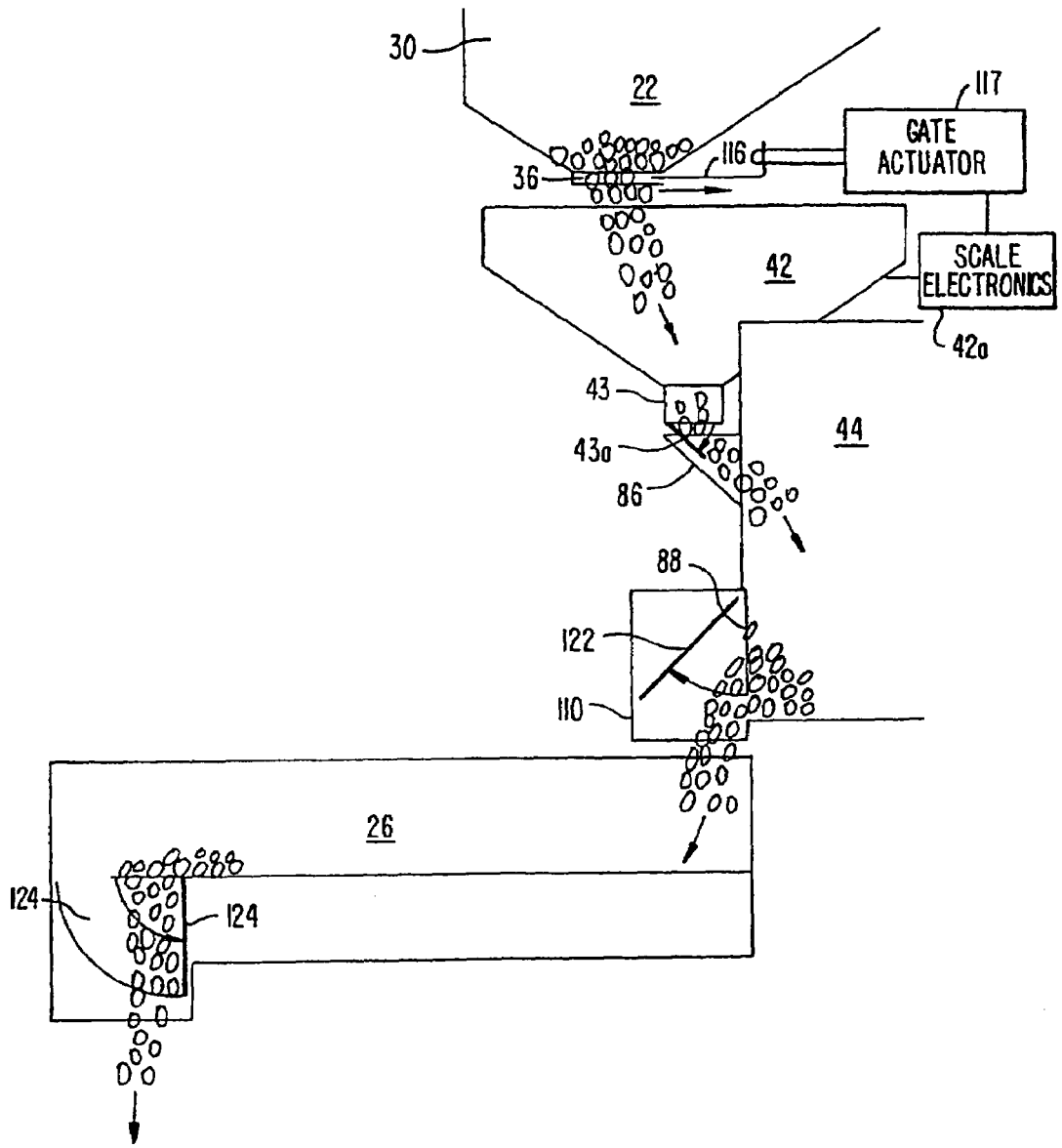
FIG. 6 is a partial, side elevational view schematically illustrating the flow of beans from the green bean storage hopper of the roasting apparatus of FIG. 2 to a roasted bean cooling tray thereof.

Referring to FIGS. 2, 4 and 6, an individual roasting machine 14 made according to this invention has a rotary storage hopper 22 for storing and dispensing the foodstuff (e.g. the beans) to be roasted. The hopper is on top of and supported by a housing 24, and a roasting drum 44 is located inside of the housing. A bean handling system directs a selected bean type from hopper 22 into the drum and, after roasting, discharges the roasted beans onto a cooling tray 26 that protrudes horizontally from the housing. Also disposed on the inside of housing 24 is an air supply system that heats intake air to the desired roasting temperature, directs the heated air into the roasting drum, and from the drum directs the used or exhaust air through air cooling and air cleaning systems for the subsequent discharge of the used air at about room temperature into the atmosphere immediately surrounding the roasting machine. Thus, when installed in a supermarket, for example, the used air will be discharged into the interior of the surrounding building. To be acceptable for complete indoor installation and operation, the used air cleaning system removes all pollutants, such as white plume smoke, oily smoke, particulate matter, including chaff, volatiles, hydrocarbons, and the like, that are generated during roasting before the air is discharged from the machine.

Figure 3:
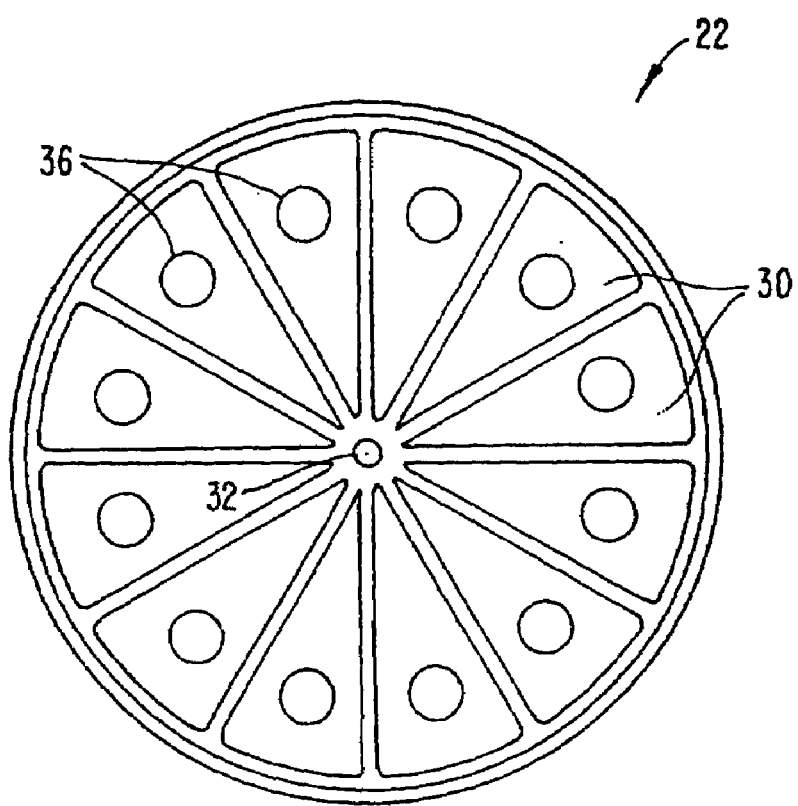
FIG. 3 is a top plan view illustrating a rotary hopper of the roasting machine of FIG. 2.

Referring to FIGS. 2 and 3, rotary hopper 22 has a cylindrical exterior, comprises, for example, sixteen sector-shaped, upright compartments 30 arranged about the center of the hopper, and is rotatable about an upright shaft 30. A drive (not separately shown) incrementally advances the hopper about the upright shaft for indexing a bean discharge opening 36 at the bottom of each compartment with a green bean scale 42 of the roasting machine. A gate 116 keeps the compartment discharge openings 36 normally closed. When the opening of a given compartment is aligned with the scale and beans are to be transferred to the roasting drum, an actuator 117 under the control of the on-board computer of the roasting machine opens the gate so that the beans gravitationally flow onto the scale. When the desired quantity of beans has been transferred to the scale, the compartment gate is closed again. In one preferred embodiment of the invention, appropriate electronics 42a of the scale generate a weight-responsive electrical signal that is used to close the compartment gate when the preselected quantity of beans has been received on the scale. The hopper 22 includes a removable lid or cover 34 (FIG. 2) to protect the beans and provide access to the hopper compartment, for example for replenishing the beans in the compartments.

Figure 5:
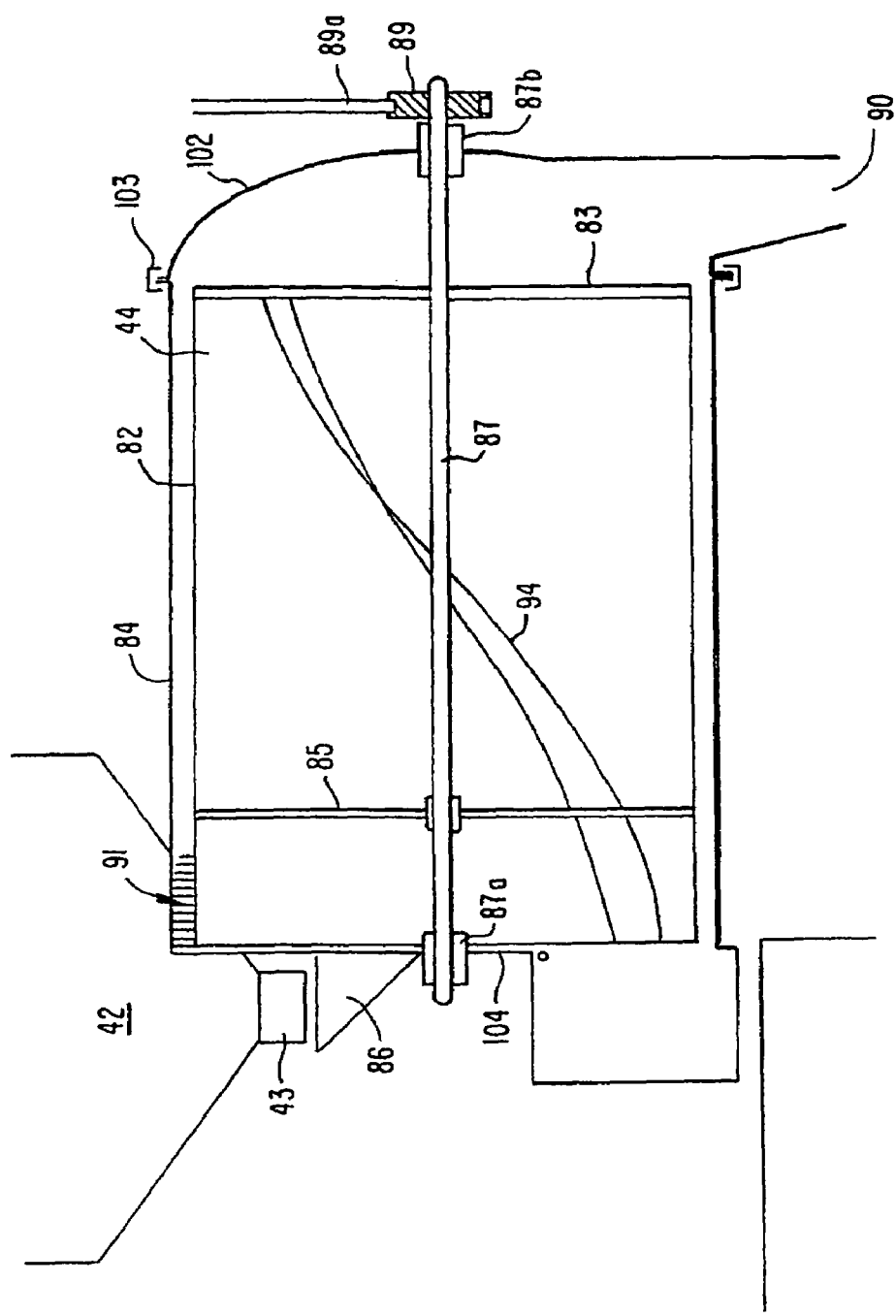
FIG. 5 is a partial, cross-sectional, side elevational view illustrating details of a roasting drum that forms part of the roasting machine of FIG. 2.
Figure 5A:
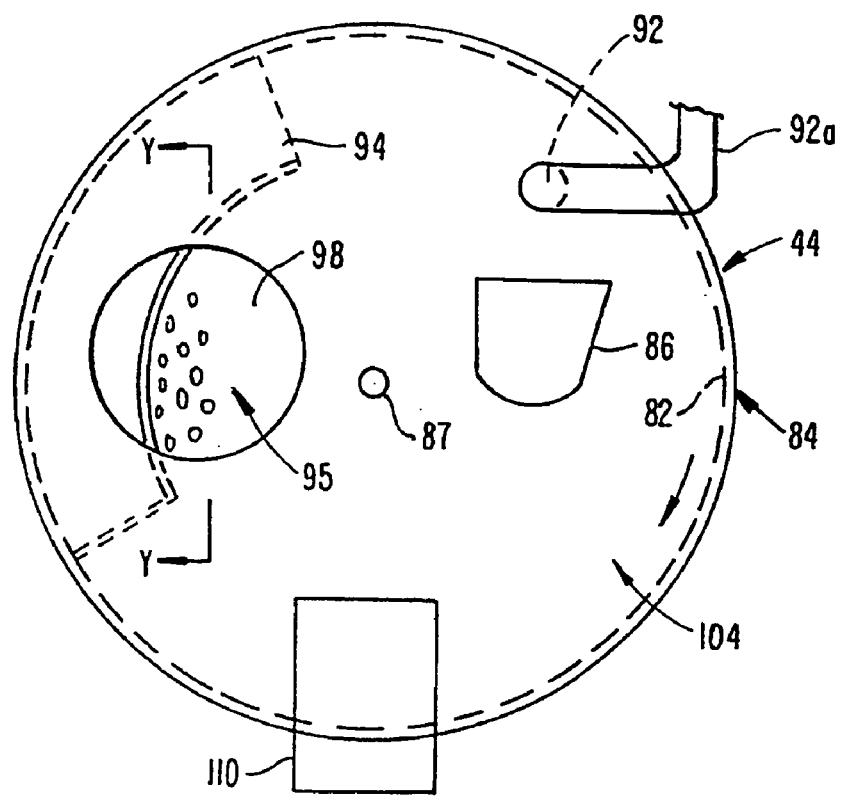
FIG. 5a is a fragmentary, front elevational view of the roasting drum of FIG. 5.
Figure 5B:
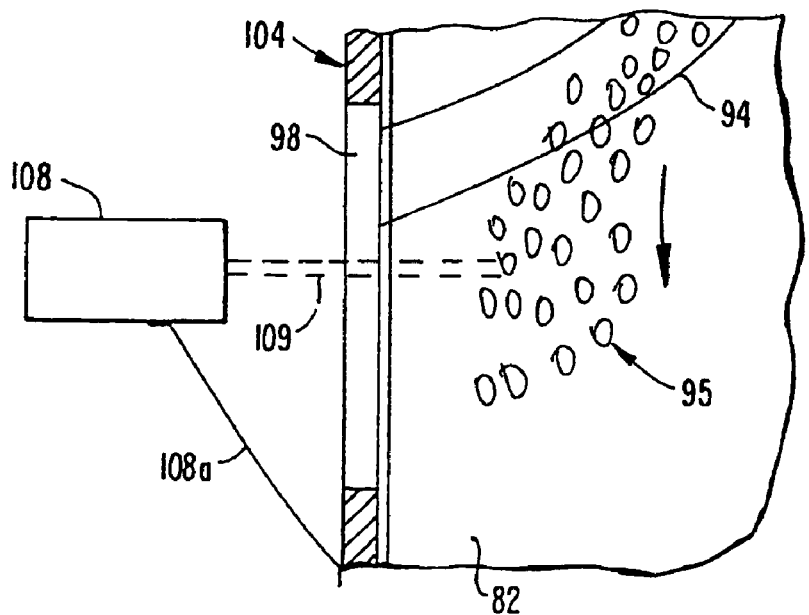
FIG. 5b is a partial, side elevational view, in section, is taken along line 5-5 of FIG. 5a, and illustrates a stream of the beans in the roasting drum being monitored by a reflectometer.

Referring to FIGS. 5, 5a and 5b, the roasting of the beans takes place in a roasting drum 44 formed by concentric inner and outer drums 82, 84. The outer drum is cylindrical, stationary, sealed and has an upright front plate that is fixed, e.g. bolted to the frame. The outer drum forms a horizontal tubular chamber that extends rearwardly and, at the aft end of the outer drum, mounts an aft end plate 102 that defines a downwardly extending exhaust air outlet 90. In a presently preferred embodiment, the aft end of the outer drum and the forward end of the aft plate 102 form mating flanges that are held together with a conventional, schematically illustrated flange clamp 103 that permits quick removal of the clamp and disassembly of the drum.

The inner drum is perforated and has a rear wall 83 and a spider 85 with preferably three equally-spaced, radial legs that project inwardly from the inner drum, or two spiders 85 (the second being substituted for the rear wall 83). At the axial center of the drum, the rear wall and spider(s) are fixed to a drum shaft 87 that is rotatable in shaft bearings 87a and 87b of front plate 104 and aft plate 103 of the outer drum. A pulley 89 driven by a motor (not separately shown) via a belt 89a rotates shaft 87 and therewith the inner drum in a given, say clockwise, direction (as viewed in FIG. 5a).

The inner drum further includes a plurality of elongated, generally longitudinally extending vanes 94 that project perpendicular to the inner drum wall and extend along a thread-like or helical line over the length of the inner drum. In the presently preferred embodiment, four such vanes are equally spaced about the inside of the inner drum, and the vanes extend through the sector-shaped openings formed by the radial legs of the spiders 85.

To remove beans that may become trapped in the annular space between the inner and outer drums, a spiral bean removal brush 91 can optionally be provided. It is made of heat-resistant material, e.g. stainless steel, extends helically over the length of the inner drum, and projects from the periphery thereof into the annular space to a point close to but slightly spaced from the inner surface of the outer drum 84. When the drum rotates, beans in the annular space between the drums are moved rearwardly by brush 91 and are ultimately discharged into the downwardly extending exhaust air outlet 90 (or into a bean collection receptacle or a separately provided bean removal conduit (not shown)).

Front plate 104 of roasting drum 44 has a tubular bean intake conduit 86 the open end of which is positioned immediately below a scale discharge opening 43 so that a fresh batch of green beans that has been weighed on the scale flows gravitationally into the drum for roasting by opening gate 43a following the weighing of the beans by the scale.

Roasted beans are removed from drum 44 via a bean outlet 88 in front plate 104 and via a discharge chute 110 onto cooling tray 26 by opening a drum discharge gate 122.

During roasting, the pressure inside the roasting drum exceeds atmospheric pressure, in a presently preferred embodiment by about 1.5 psi. To prevent the escape of the hot roasting air, a gate—in the presently preferred embodiment of the invention, a butterfly disc 86a—is placed in the tubular conduit 86 between scale 42 and the interior of the drum. The butterfly disc includes a heat-resistant seal (not separately shown) that prevents the hot, pressurized air in the drum from escaping through the bean intake conduit. The butterfly disc remains closed at all times except when a fresh batch of green beans is to be gravitationally transferred from the scale to the drum interior. It is operated by a suitable drive (not separately shown) that is under the control of the computer of the roasting machine and is preferably synchronized with the activator (not shown) for scale gate 43a.

Similarly, bean discharge gate 122 is provided with a seal formed by a high temperature seal ring (not separately shown) that prevents the escape of hot, pressurized air from the interior of the drum when the gate is in its closed position. In the presently preferred embodiment of the invention, discharge gate 122 is hinged to the front plate 104 along its upper edge and a linear drive (not separately shown) is provided for opening and closing the discharge gate. The drive for the discharge gate is also under the control of the computer of the roasting machine.

As is described in more detail below, the roasting of the beans is monitored with a reflectometer 108 (or a spectrometer for monitoring color) suitably mounted adjacent to front plate 104 with a holder 108a. The reflectometer directs a laser beam 109 through a window 98 in the front plate into the interior of the roasting drum.

Finally, rear plate 104 includes a hot roasting air inlet 92 that receives hot roasting air from an air intake conduit 92a.

Turning now to the manner in which fresh or green coffee beans are roasted in accordance with the invention, different types of green beans are placed into the hopper compartment 30 and an appropriate command is entered into an on-board computer 40 of the roasting machine which of the bean types is to be roasted. Its computer selects the appropriate hopper compartment and activates the hopper drive (not shown in the drawings) to rotationally advance the hopper until the discharge opening 36 of the selected compartment is immediately above scale 42. Actuator 117 opens hopper gate 116 and green beans gravitationally drop onto the scale where they are weighed. When the desired weight of beans that is to be roasted has been received on the scale, the actuator, preferably via a signal from scale electronics 42a, closes the hopper gate and therewith terminates the transfer of beans.

The computer next activates the drive for bean inlet closure disc 86a to open it and also opens gate 43a in scale discharge opening 43, thereby permitting the beans to gravitationally flow from the scale via bean inlet 86 into the interior of inner drum 82. Thereafter intake disc gate 86a, as well as bean discharge gate 122, are closed, or maintained closed, to form a seal and prevent the escape of pressurized air from the interior of the drum through the bean intake or outlet.

The drum drive (not separately shown) is energized, to rotate in a drum 82 via pulley 89, and the air circulation system is activated to flow hot roasting air through hot air inlet 92 and the interior of the drum for discharge through exhaust or used air outlet 90, thereby bringing the beans to the roasting temperature.

The green beans introduced into the drum at the beginning of roasting initially rest at the bottom of the inner drum 82. When rotation commences, the radially inwardly extending vanes 94 pick up quantities of beans in a pocket defined by each vane and the portion of the inner drum adjoining the vane. As rotation of the drum continues, the beans in the pocket are lifted upwardly until the vane rises above the axis of shaft 87, at which point the side of the vane facing the pocket becomes downwardly inclined and the beans roll off the vane under the influence of gravity. The vanes are helically curved so that the sides thereof that form the pocket slope downwardly towards front plate 104 of the roasting drum. As a result, as the inner drum rotates, the beans in the pocket are also urged towards the front plate. Thus, a stream of beans 95 from the elevated vane is intermittently formed in the vicinity of window 98 each time one of the vanes (with beans in the pocket) rises above the shaft centerline.

In the process, the beans become heated to the roasting temperature and as roasting time continues they undergo a gradual color change and darkening, which, for coffee beans, progresses from an initial gray-green color of the green beans to a light color giving the beans a bleached appearance and then to increasingly dark shades of brown.

The laser (not separately shown) of the reflectometer 108 is continuously or intermittently activated to direct laser light onto the stream of beans 95 on the inside of the drum. Laser light impinging on the beans is reflected and the reflected light is sensed and analyzed by the reflectometer, for example by determining its wavelength. The desired darkness of the finished roasted beans (which was previously downloaded from the computer at the central control station) is stored in the memory of the on-board computer 40 of the roasting machine and compared with an output signal generated by the reflectometer that indicates the darkness of the beans in real time. When the signal from the reflectometer matches the stored signal in the on-board computer, roasting is terminated. In a preferred embodiment, roasting is terminated by initially ceasing the heating of the roasting air flowing into the drum while continuing to rotate the inner drum (with bean outlet gate 122 closed) for about 30 to 45 seconds in a gradually cooling environment that enhances the finish that can be obtained with many types of beans.

In addition, while full heat roasting of the beans continues, the light/dark development of the beans inside the drum is monitored by reflectometer 108, which generates corresponding signals that are fed to the on-board computer. In a preferred embodiment, the memory of the on-board computer includes light/dark level data that was generated during sample roasting at the central control station, typically as a function of roasting time and/or roasting temperature. Whenever the darkness level of the beans being roasted deviates from the corresponding stored darkness level data, operating parameters, such as the roasting air temperature and/or roasting air flow rate, are adjusted to bring the darkness level of the beans being roasted in compliance with the stored darkness information in the memory of the on-board computer. In this manner, the test roast, which was performed to establish optimal roasting parameters for a given type of bean and/or roasting profile, is precisely replicated at each and every roasting operation on any and all of the individual roasting machines that are networked with the central computer at the central computer 12 at control station 11.

Once the beans are ready for discharge, the on-board computer activates the drive (not shown) for bean discharge gate 122 by moving it into its open position shown in FIG. 6. The continued rotation of inner drum 83, coupled with the helical shape of vanes 94 therein, gradually moves the beans in the direction of bean discharge opening 88, from where the roasted beans gravitationally drop onto cooling tray 26.

The cooling tray is preferably circular in shape (see FIG. 2) and includes one or more wiper arms 27 that slowly rotate with upright shaft 27a protruding from the tray. The arms gradually move the beans over the tray to facilitate their cooling, and, upon completion of the cooling, push the beans through a finish roasted bean discharge opening 124 to a suitable collection point or into a canister (not shown). The discharge opening is preferably located adjacent the periphery of the cooling tray, and the wiper arms are shaped so that they slowly direct the beans towards the periphery of the tray. The discharge opening is normally closed by a gate 125 that is opened via a suitable actuator (not shown) that is manually or automatically (by the on-board computer) opened after the beans have been sufficiently cooled. The cooling tray preferably includes perforations 26a (not shown and of a sufficiently small size to prevent beans from dropping through or becoming lodged in them) so that cooling air can be flowed over the beans on the tray to accelerate their cooling and, in accordance with an embodiment of the invention, to use the heat of the cooling beans for preheating fresh air before it is heated for roasting a new batch of green beans that was placed into the drum.

Referring to FIGS. 4 and 7-10, each individual roasting machine 14 includes an air supply or circulation system that comprises a blower 48 for generating an air flow through roasting drum 44 for the eventual discharge of the air from the machine. In a presently preferred embodiment of the roasting machine in which 6-lb. batches of green beans are roasted in about twelve minutes, the blower has a 2½ HP motor, generates a pressure rise of about 1.5 psi at about 50 cfm through the air circulation system, and heats the air, as a result of the compression of the air, by about 30° F.-50° F. (about 17° C.-28° C.).

Figure 8:
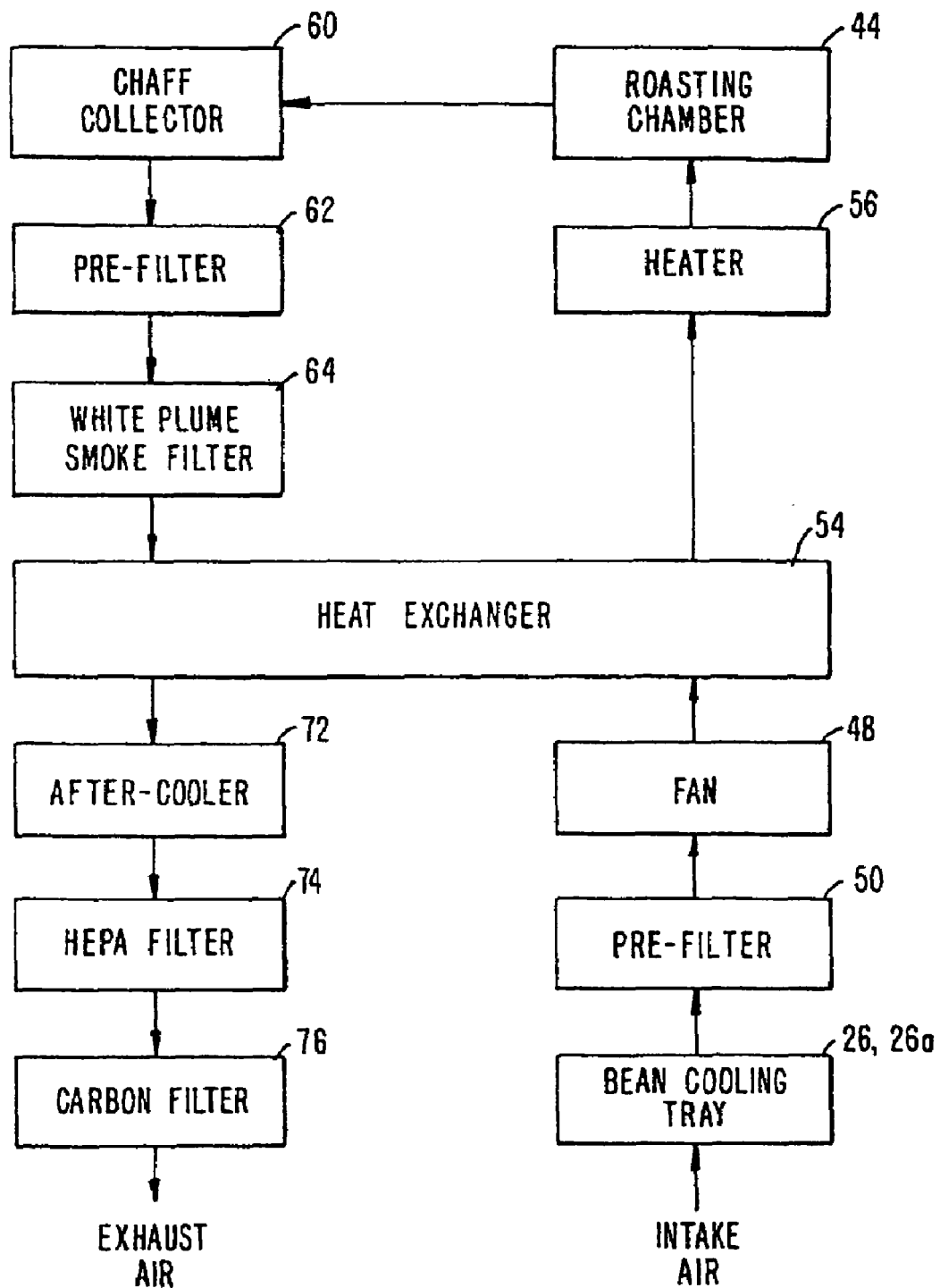
FIG. 8 is a block diagram illustrating the air control and handling system of the roasting machine of FIG. 2.

As is best seen in FIG. 8, the air circulation system preferably receives fresh intake air that was preheated by flowing it over just-roasted, still-hot beans on cooling tray 26 and through perforations 26a therein to thereby reduce the overall energy consumption of the machine. Since the intake air may pick up particulates and white plume smoke as it passes over the roasted beans on the cooling tray, a prefilter 50 is provided to remove such smoke and debris before the air enters fan 48. Filter 50 preferably comprises a 0.3-micron HEPA filter with a relatively low pressure drop so that it can remove the white plume smoke and smoke particulates from the intake air.

Fan 48 is coupled to a heat exchanger 54, which preheats the air from the fan. The structure and operation of the heat exchanger is discussed in more detail below. The preheated air flows from the heat exchanger 54 to a heater 56 for heating it to the desired roasting temperature. The heater 56 is preferably a flow-through electric duct (tubular) heater 56 capable of heating the incoming air from about 120° F.

(about 49° C.) and at 50 cfm to the roasting temperature, e.g. about 500° F. (about 260° C.). From the heater the roasting air flows via a conduit 92a and past roasting air inlet 92 into and through the roasting drum from which it exits via used air exit 90.

In the drum, the green beans give off particulates, including chaff, as well as white plume smoke, oily smoke, volatiles, hydrocarbons, and the like, which are carried out of the roasting drum by the air. To enable the discharge of the air into the indoor environment surrounding each individual roasting machine 14, the used roasting air must be cleaned and cooled before it can be discharged.

Chaff, an onionskin-like husk byproduct that is flaked off the beans in the roasting drum, is removed in a chaff collector 60 located downstream of and coupled to roasting drum 44. The chaff collector 60 comprises a vortex particulate separator (not shown) that captures the chaff and lets the air through. The chaff collecting tray is periodically removed and cleaned as needed.

A primary filter 64 is coupled to the chaff collector 60 via a conduit (not shown) for the removal of tars and chaff fines. In one embodiment, the primary filter 64 is made of superfine steel wool media. In another embodiment, a prefilter 62 made from superfine 30 micron media is positioned upstream of the primary filter to remove fines from the air flow and prevent a premature plugging of the filter by the fines.

From the primary filter 64, the used air flows to heat exchanger 54 for cooling. In the presently preferred embodiment, the heat exchanger is formed of a plurality of heat pipes (not shown) coupled to cooling fins. The relatively cool intake air flows in one direction over one end of the heat pipe array and the relatively hot exhaust air, separated from the cool air by a wall, is conveyed in the opposite direction over the other end of the heat pipe array. Heat from the hot exhaust air is transferred via the heat pipe array to the cool intake air flowing from the blower 48 to preheat it before it enters heater 56 and thereby improve the energy efficiency of the roasting machine. The heat exchanger is about 80% efficient and typically cools the air exhaust air from about 350° (about 177° C.) to 100° F. (about 38° C.).

Alternatively, the heat exchanger can also be formed of double concentric counterflow hoses or pipes. In that case, an outer tube 66 conveys the relatively cool intake air in one direction and an inner tube 68 conveys the relatively hot exhaust air in the opposite direction, or vice versa. Heat from the exhaust air is transferred via inner tube 68 to the cool intake air flowing towards fan 48 to thereby preheat it before it enters heater 56 to thereby improve the energy efficiency of the roasting machine.

The air is then cooled to about 100° F. (about 38° C.) in an aftercooler 72 disposed downstream of and receiving the air from the heat exchanger 54. It typically cools the air from about 350° F. (about 177° C.), the exit temperature at the main heat exchanger, to about 100° F. (38° C.). In the illustrated alternative embodiment, aftercooler 72 employs a finned-tube heat sink of a serpentine configuration with sufficient length to achieve the desired temperature drop.

A high efficiency particulate accumulator ("HEPA") filter 74 is coupled to the heat exchanger and a carbon filter 76 is coupled to the HEPA filter 74. The HEPA filter 74 is preferably a 0.3-micron media that captures white plume smoke and particles as small as ½ micron with a 99+% efficiency. The carbon filter 76 employs activated carbon that filters VOCs and hydrocarbons ($SO_2$, $NO_2$, etc.) in the used air stream before it is discharged from the machine. The carbon filter 76 can be used to control the amount of VOCs, and therewith the coffee aroma that emanates from the roasting machine.

Thus, and as is illustrated in FIG. 8, the intake air enters the prefilter 50, which filters out smoke and/or debris in the air. The fan 48 produces a flow of the air that traverses the entire roasting machine in no more than about 1 second and, preferably, in as little as about ¼ second while the air is heated from ambient at intake to about 500° F. (about 260° C.) for roasting and is then cooled again to about room temperature (approximately 100° F., 38° C.) at discharge. The hot air therefore flows through the roasting drum 44 in a continuous, high temperature flow to thereby effectively roast the beans.

Figure 9:
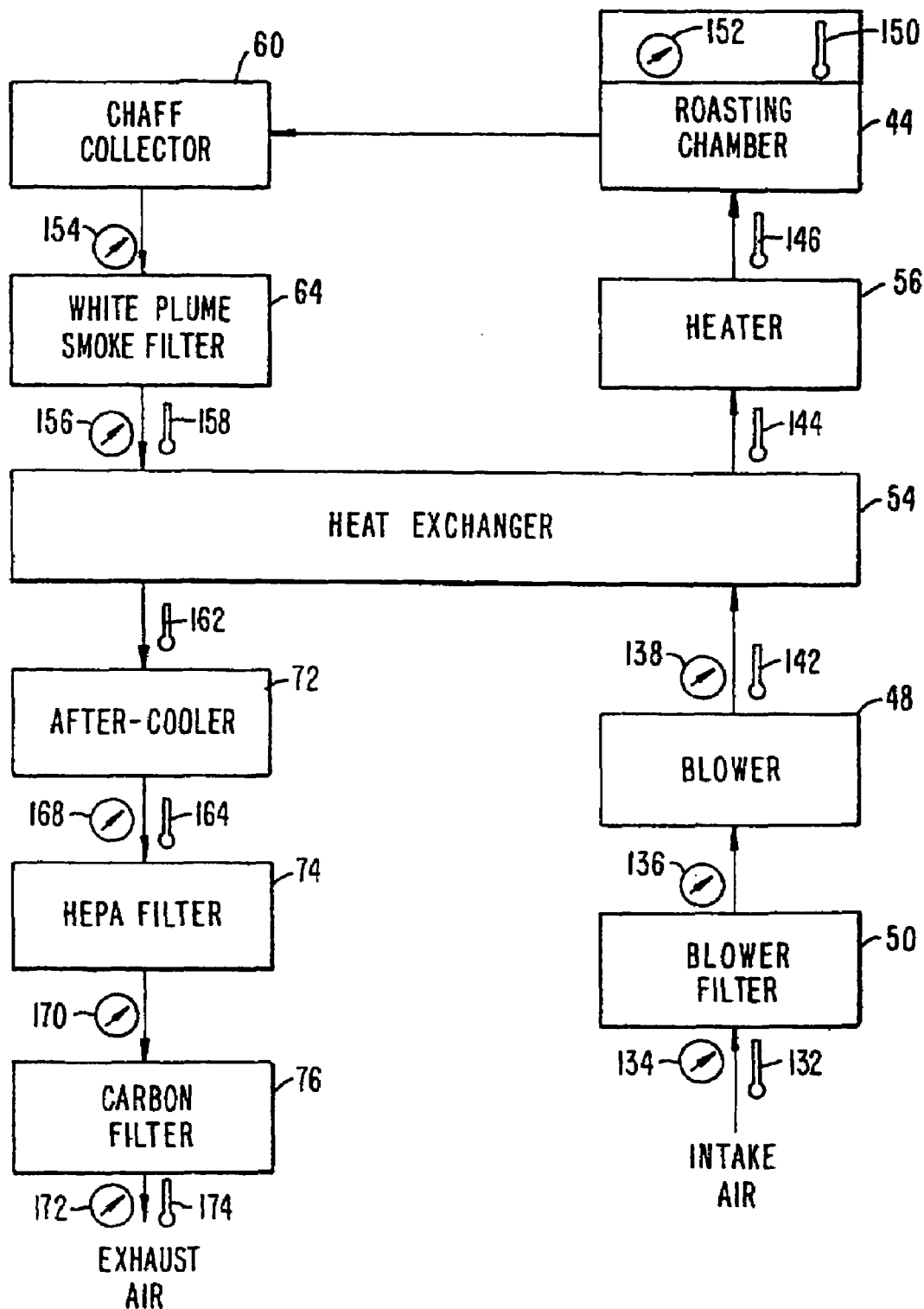
FIG. 9 is a block diagram of the internal air control and handling system of FIG. 8 schematically illustrating the arrangement of process sensors employed in the roasting machine of FIG. 2.

Referring to FIG. 9, sensors are employed throughout each individual roasting machine 14 for monitoring and controlling the roasting of the beans.

For example, a temperature gauge or thermometer 132 and a pressure gauge 134 are disposed at the inlet of the prefilter 50 to measure the inlet air temperature and pressure. A pressure gauge 136 measures the inlet pressure of the fan 48 and another pressure gauge 138 measures the outlet pressure of the fan. The temperature of the air at the inlet and outlet of the heat exchanger 54 is measured with temperature gauges 142 and 144. A further temperature gauge 146 at the outlet of the heater 56 measures the roasting temperature of the air. A thermometer 150 and a pressure gauge 152 can be provided to measure the temperature and pressure in the roasting chamber 44. A pair of pressure gauges 154, 156 at the inlet and outlet of the smoke filter 64 measure the pressure drop across it. The exhaust air temperature drop across the heat exchanger 54 is measured with a pair of thermometers 158, 162 disposed at the inlet and outlet of the heat exchanger. Another thermometer 164 provided at the outlet of the aftercooler 72 measures the temperature drop caused by it. A pressure gauge 168 at the inlet of the HEPA filter 74 measures the inlet pressure. A pressure gauge 170 at the outlet of the HEPA filter 74 measures the outlet pressure of the HEPA filter 74 and the inlet pressure of the carbon filter 76. A pressure gauge 172 at the outlet of the carbon filter 76 measures the outlet pressure. If desired, flow rates at various points of the system may be measured with appropriate flow gauges.

As discussed above, while it is preferred to use a reflectometer to monitor the darkness of the beans during roasting, spectrometers can be used instead for measuring the color of the beans. Spectrometers or calorimeters capable of detecting colors that can be used with the present invention are known. For example, U.S. Pat. No. 5,684,582 issued Nov. 4, 1997 to Eastman et al. and U.S. Pat. No. 5,504,575 issued Apr. 2, 1996 to Stafford, which are incorporated by reference herein, disclose useable spectrometers. The patent to Stafford specifically discusses the use of a spectrometer to monitor the color of food products to ensure a uniform color for the consumer.

On-board roasting computer software of the roasting machine 14 serves, among others, the following functions:

1. Receiving in-store operator roasting requests and initiating roasting sequence, including preheating system check, upon request.
2. Rotating the rotary hopper to the desired green beans position and releasing a correct quantity of the beans into the scale funnel 42.
3. Releasing the beans from the scale funnel 42 into a the roasting chamber 44.

4. Roasting the beans to the appropriate recipe established at central control station 11 and, if desired, modifying the recipe with real-time barometric input.
5. Guiding roasting development and final roast degree (darkness) by real-time input from the laser reflectometer 108.
6. Starting the cooling tray sweep arm and discharging the roasted beans from the roasting chamber 44 to the cooling tray 26 when the spectrometer 108 determines that roasting is complete.
7. Stirring/cooling the finished beans on the cooling tray 26 and discharging them into the discharge container when ready.
8. Starting loading/roasting the next batch upon discharge of the previous batch to the cooling tray 26.

Figure 7:
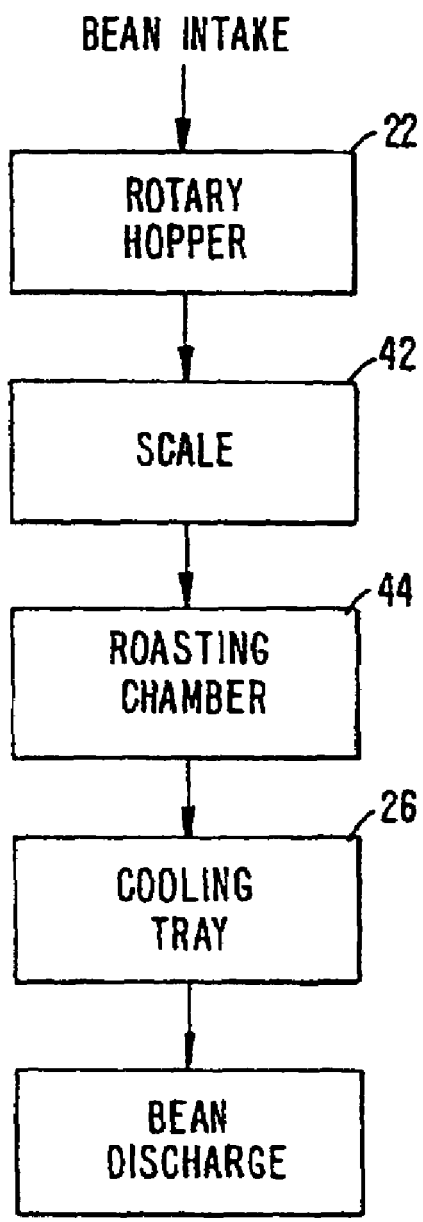
FIG. 7 is a block diagram of the bean flow illustrated in FIG. 6.
Figure 10:
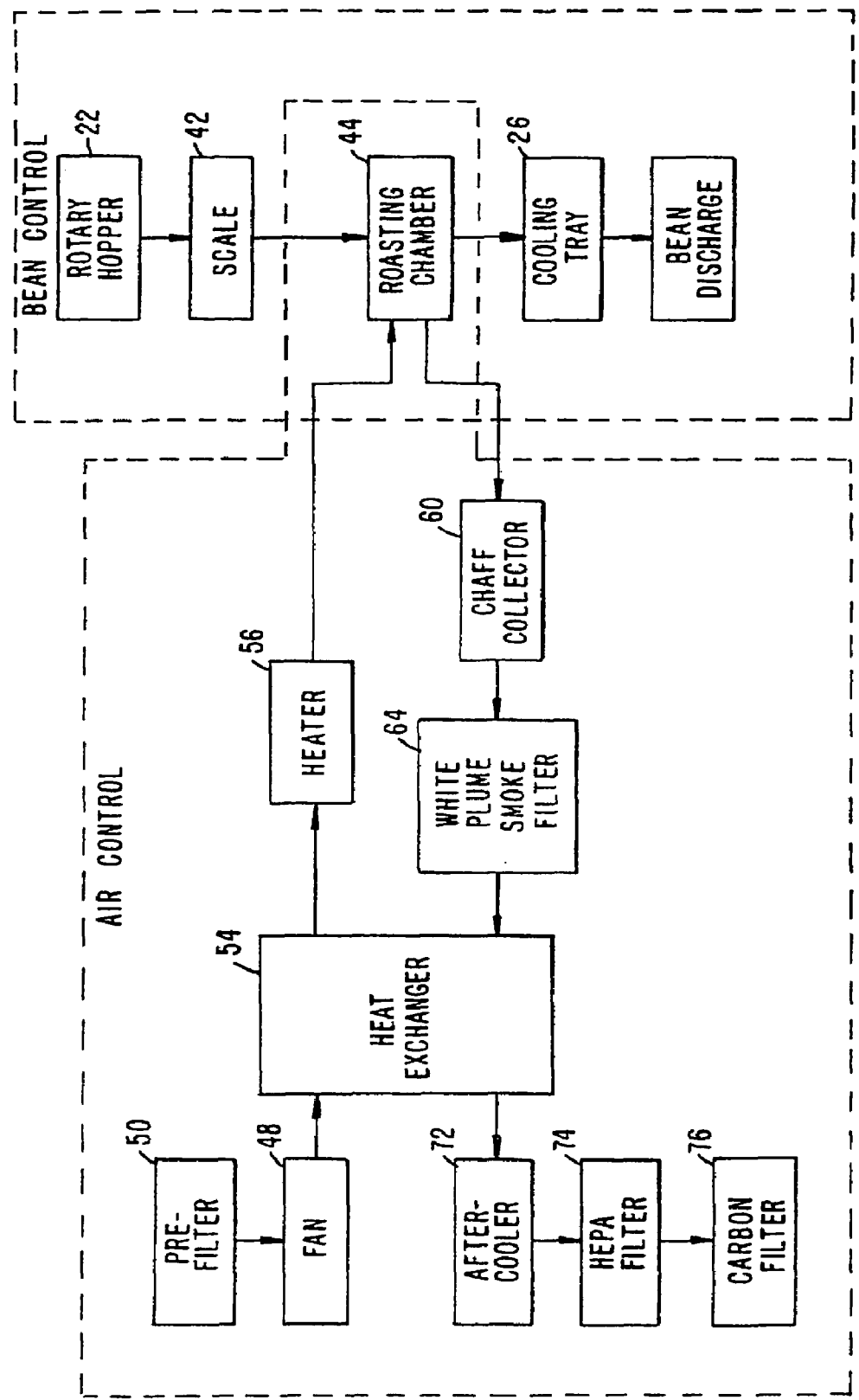
FIG. 10 is a block diagram illustrating the interaction of the bean flow and the heated roasting air cleaning system employed in the roasting machine of FIG. 2.

The block diagram in FIG. 10 illustrates a roasting system that comprises the combined configuration of the bean handling system of FIG. 7 and the internal air control system of FIG. 8. The arrows illustrate the bean flow and the air flow. The point of intersection between the two flows is located at the roasting chamber 44, in which the heated air is used to roast the beans. In this embodiment, the intake air comes from and the exhaust air is released into the surrounding environment at a temperature that is close to room temperature. By circulating air taken from outside surroundings of the roasting apparatus 20 and releasing it back into the surroundings, the internal air control system is an open-loop system.

An alternative is a closed-loop air circulation system that comprises substantially the same components as the open-loop system. The primary difference is that only a small proportion, e.g. 20% of the used air, is discharged to the atmosphere, while the remainder, after thorough cleaning, is recirculated through the roasting machine. The earlier discussed HEPA and charcoal filters 74, 76 are effective only at relatively low temperatures of about 100° F. (about 38° C.). To prevent the need for cooling the used air to such low temperatures in a closed-loop air circulation system while still removing white plume smoke, VOCs, hydrocarbons, and the like, a catalytic converter (not shown) may be used instead of such filters. With a catalytic converter the cleaned air can be recirculated to the fan of the machine at significantly higher temperatures, which, in turn, reduces the energy consumption of the machine. Water removed from the green beans during roasting and entrained in the recirculating used roasting air is discharged from the system with the earlier mentioned release of a small, e.g. 20%, proportion of the used air.

What is claimed is:

1. A method of roasting coffee beans comprising the steps of:
    establishing the degree to which the coffee beans must be roasted to attain a desired aroma;
    generating a measurable first parameter which is indicative that the coffee beans have been sufficiently roasted to yield the desired aroma;
    storing the first parameter;
    roasting fresh coffee beans at a roasting temperature by flowing heated air over the fresh coffee beans;
    filtering substantially all pollutants from the heated air following the roasting step;
    thereafter reheating and recirculating a major portion of the substantially pollutant-free air over the fresh coffee beans to thereby continue roasting;
    cooling a minor portion of the filtered air to no more than about 115° F. and discharging the cooled minor portion of the air into an interior of a building frequented by humans while reheating and recirculating the major portion of the air for further use during roasting;
    monitoring a second parameter which is compatible with the first parameter and is generated by the fresh coffee beans during roasting;
    upon detecting a match between the first and second parameters, discontinuing the roasting step; and
    wherein the steps of roasting, filtering, reheating, recirculating, cooling and discharging are simultaneously and continuously performed while roasting is in progress.

2. A method according to claim 1 wherein the first parameter is one of the color and darkness of the coffee beans and the second parameter is one of the color and darkness of the fresh coffee beans during roasting.

3. A method according to claim 1 wherein the steps of roasting, filtering, reheating, recirculating, cooling and discharging are simultaneously and continuously performed while roasting is in progress;
    including adjusting the step of discontinuing the roasting of the fresh coffee beans as a function of at least one of the roasting temperature and atmospheric pressure.

4. A method according to claim 1 wherein the step of monitor comprises making a spectral analysis of the fresh coffee beans during the roasting step.

5. A method according to claim 4 wherein the step of making a spectral analysis comprises directing a laser beam onto the fresh coffee beans during the roasting step.

6. A method according to claim 5 wherein the laser beam has a wavelength in the range of between about 600 to 800 nm.

7. A method according to claim 1 further comprising the steps of providing a multiplicity of different coffee bean types, establishing and storing the first parameter for each coffee bean type, prior to the roasting step selecting one of the multiplicity of coffee bean types for roasting; and wherein the step of discontinuing is carried out when there is a match between the first parameter for the selected coffee bean type and the second parameter.

8. A method according to claim 7 further comprising the step of establishing a plurality of first parameters for at least one of the multiplicity of coffee bean types, each of which defines a different degree to which the coffee beans must be roasted to attain correspondingly differing desired aromas; prior to the roasting step selecting one of the plurality of first parameters for the at least one coffee bean type; and wherein the step of discontinuing is performed when the second parameter matches the selected one of the first parameters.

9. A method of automatically roasting coffee beans to attain a predetermined, desired coffee aroma, the method comprising the steps of:
    roasting a sample of the beans to a degree at which coffee made with the beans exhibits the desired aroma;
    sensing one of a color and a darkness of the beans when the beans have reached the degree of roasting and from the sensed color or darkness generating a first parameter which is indicative of the sensed color or darkness of the bean sample;
    storing the first parameter; thereafter roasting a batch of more than one pound of fresh beans by flowing heated air over the fresh beans;
    cleaning the heated air after it has passed the fresh beans so that the air is substantially pollutant-free;
    cooling the air after the air has passed the fresh beans to no more than about 115° F. while continuing flowing the heated air over the fresh beans;

discharging the cooled, pollutant-free air into a substantially closed room frequented by humans;

monitoring one of the color and darkness of the fresh beans being roasted and generating a second parameter which is indicative of a color or darkness of the fresh beans;

comparing the first and second parameters during roasting of the fresh beans;

terminating the roasting of the fresh beans when the first and second parameters match; and wherein the steps of roasting, cleaning, cooling and discharging are simultaneously and continuously performed while roasting is in progress.

10. A method for uniformly roasting coffee beans at a plurality of geographically separate locations, the method comprising:

placing a roasting machine at each location inside an enclosed room frequented by humans;

equipping each roasting machine with a roasting container for holding fresh beans while the beans are being roasted, a hot air supply for heating the fresh beans to a roasting temperature, and an air removal system for directing used air away from the container;

removing from the used air substantially all debris, smoke, oil, and other pollutants in a filtration system;

after the step of removing, cooling the used air, discharging the at least a portion of the cooled air into the enclosed room while continuing heating the fresh beans;

recirculating a remaining portion of the cooled air to the hot air supply;

directing a laser light beam of a frequency in the range of between about 600-800 nm onto the beans in the container during roasting;

generating an output signal from laser light reflected by the beans which is a function of the observed darkness of the beans;

providing each roasting machine with a computer including a memory; feeding the output signal to the computer;

at a central control station determining an optimal darkness for each bean type that will be roasted by the roasting machines;

at the control station generating a control signal which reflects the optimal darkness of each roasted bean type;

downloading the control signal from the central control station to the computer of each roasting machine;

during roasting at any given roasting machine comparing the control signal stored in the associated memory with the output signal generated by the instrument; when the compared signals match, generating a command signal; and using the command signal to terminate the roasting of the beans in the container;

wherein the steps of removing, cooling, discharging and recirculating are simultaneously and continuously performed while roasting is in progress.

11. A method according to claim 10 further comprising the steps of:

keeping an inventory of fresh beans proximate each roasting machine;

monitoring the size of the fresh bean inventory;

generating a low-inventory signal when the fresh bean inventory drops below a predetermined level;

transmitting the inventory control signal to the central control station; and transferring additional fresh beans to the roasting machine which generated the low-inventory signal upon receipt thereof at the control station.

12. A method according to claim 10 wherein each roasting machine has a plurality of different fresh bean types which can be roasted and wherein the method further comprises the steps of:

generating an optimal darkness signal for each bean type at the control station; downloading each darkness signal to the computers of the roasting machines of the system and, during roasting at any given one of the roasting machines, comparing the output signal from the instrument with the stored darkness signal which corresponds to the bean type being roasted in the container.

13. A method of roasting coffee beans comprising the steps of:

establishing the degree to which the coffee beans must be roasted to attain a desired aroma;

generating a measurable first parameter which is indicative that the coffee beans have been sufficiently roasted to yield the desired aroma;

storing the first parameter;

roasting a batch of more than one pound of fresh coffee beans at a roasting temperature by flowing heated air over the fresh coffee beans;

while flowing heated air over the fresh coffee beans, removing substantially all pollutants from the air downstream of the fresh coffee beans being heated in a filtration system, cooling at least a portion of the air downstream of the fresh coffee beans to no more than about 115° F., and thereafter, while continuing to flow heated air over the fresh coffee beans, exhausting the cooled air directly into a room of a building without recirculating any part of the cooled air into the filtration system;

monitoring a second parameter which is compatible with the first parameter and is generated by the fresh coffee beans during roasting; and, upon detecting a match between the first and second parameters, discontinuing the roasting step.

14. A method according to claim 13 wherein the first parameter is one of the color and darkness of the coffee beans and the second parameter is one of the color and darkness of the fresh coffee beans during the roasting step.

15. A method according to claim 13 including adjusting the step of discontinuing the roasting of the fresh coffee beans as a function of at least one of the roasting temperature and atmospheric pressure.

16. A method according to claim 13 wherein the step of monitoring comprises making a spectral analysis of the fresh coffee beans during the roasting step.

17. A method according to claim 16 wherein the step of making a spectral analysis comprises directing a laser beam onto the fresh coffee beans during the roasting step.

18. A method according to claim 17 wherein the laser beam has a wavelength in the range of between about 600 to 800 nm.

19. A method according to claim 18 further comprising the steps of providing a multiplicity of different coffee bean types, establishing and storing the first parameter for each coffee bean type, prior to the roasting step selecting one of the multiplicity of coffee bean types for roasting; and wherein the step of discontinuing is carried out when there is a match between the first parameter for the selected coffee bean type and the second parameter.

20. A method according to claim 19 further comprising the step of establishing a plurality of first parameters for at least one of the multiplicity of coffee bean types, each of which defines a different degree to which the coffee beans must be roasted to attain correspondingly differing desired aromas; prior to the roasting step selecting one of the plurality of first parameters for the at least one coffee bean type; and wherein the step of discontinuing is performed when the second parameter matches the selected one of the first parameters.

21. A method of roasting coffee beans comprising the steps of:
  establishing the degree to which the coffee beans must be roasted to attain a desired aroma by determining a first parameter which comprises at least one of a color and a degree of darkness which the coffee beans must have to yield the desired aroma;
  generating at least one second parameter which reflects a predetermined development of the first parameter during a roasting of the coffee beans;
  storing the parameters;
  roasting fresh coffee beans at a roasting temperature;
  monitoring the first parameter during roasting and discontinuing the roasting step when the coffee beans reaches the first parameter;
  monitoring the at least one second parameter during roasting; and
  adjusting the roasting step when the second parameter indicates that a deviation from the predetermined development of the first parameter occurred to thereby reestablish the predetermined development of the second parameter.

22. A method according to claim 21 wherein the second parameter comprises at least one of the roasting temperature and atmospheric pressure.

23. A method according to claim 21 wherein the step of monitoring the first parameter comprises directing a laser beam onto the fresh coffee beans during the roasting step.

24. A method according to claim 23 wherein the laser beam has a wavelength in the range of between about 600 to 800 nm.

25. A method according to claim 21 further comprising the steps of providing a multiplicity of different coffee bean types, establishing and storing the first parameter for each coffee bean type, prior to the roasting step selecting one of the multiplicity of coffee bean types for roasting; and wherein the step of discontinuing is carried out when the coffee beans reach the first parameter for the selected coffee bean type.

26. A method according to claim 25 further comprising the step of establishing a plurality of first parameters for at least one of the multiplicity of coffee bean types, each of which defines a different degree to which the coffee beans must be roasted to attain correspondingly differing desired aromas; prior to the roasting step selecting one of the plurality of first parameters for the at least one coffee bean type; and wherein the step of discontinuing is performed when the coffee beans reach the selected one of the first parameters.

27. A method according to claim 21 wherein the roasting step comprises flowing heated air over the fresh coffee beans, and including the steps of removing substantially all pollutants from the air downstream of the fresh coffee beans being heated, cooling the air downstream of the fresh coffee beans to no more than about 115° F., and thereafter exhausting the cooled air into an enclosed room of a building.

28. A method according to claim 21 wherein the step of roasting includes flowing heated air over the fresh coffee beans, and including the steps of filtering substantially all pollutants from the heated air following the roasting step, thereafter reheating and recirculating a major portion of the substantially pollutant-free air over the fresh coffee beans to thereby continue the roasting step; and discharging a minor portion of the filtered air prior to reheating and recirculating the major portion of the air.

29. A method of roasting coffee beans in a supermarket located inside a building, the method comprising the steps of:
  establishing the degree to which the coffee beans must be roasted to attain a desired aroma;
  generating a measurable first parameter which is indicative that the coffee beans have been sufficiently roasted to yield the desired aroma;
  storing the first parameter;
  roasting fresh coffee beans at a roasting temperature by flowing heated air over the fresh coffee beans;
  while flowing heated air over the fresh coffee beans removing substantially all pollutants from the air downstream of the flesh coffee beans being heated, cooling the air downstream of the fresh coffee beans to no more than about 115° F. and thereafter, while continuing to flow heated air over the fresh coffee beans, exhausting the cooled air into the supermarket;
  monitoring a second parameter which is compatible with the first parameter and is generated by the fresh coffee beans during roasting; and,
  upon detecting a match between the first and second parameters, discontinuing the roasting step.

30. A method of automatically roasting coffee beans to attain a predetermined, desired coffee aroma, the method comprising the steps of:
  roasting a sample of the beans inside a supermarket to a degree at which coffee made with the beans exhibits the desired aroma;
  sensing one of a color and a darkness of the beans when the beans have reached the degree of roasting and from the sensed color or darkness generating a first parameter which is indicative of the sensed color or darkness of the bean sample;
  storing the first parameter;
  thereafter roasting fresh beans by flowing heated air over the fresh beans;
  cleaning the heated air after the heated air has passed the fresh beans so that the air is substantially pollutant-free;
  cooling the air after the air has passed the fresh beans to no more than about 115° F. while continuing flowing the heated air over the fresh beans;
  discharging the cooled, pollutant-free, room temperature air into the supermarket;
  monitoring one of the color and darkness of the fresh beans being roasted and generating a second parameter which is indicative of a color or darkness of the fresh beans; and
  comparing the first and second parameters during roasting of the fresh beans; and terminating the roasting of the fresh beans when the first and second parameters match.

* * * * *